(12) United States Patent
Wu et al.

(10) Patent No.: US 9,591,037 B2
(45) Date of Patent: Mar. 7, 2017

(54) DISTRIBUTED AUDIO MIXING AND FORWARDING

(71) Applicant: Cisco Technology, Inc., San Jose, CA (US)

(72) Inventors: Duanpei Wu, San Jose, CA (US); Yanghua Liu, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 14/066,841

(22) Filed: Oct. 30, 2013

(65) Prior Publication Data

US 2015/0120830 A1   Apr. 30, 2015

(51) Int. Cl.
*G06F 15/16* (2006.01)
*H04L 29/06* (2006.01)

(52) U.S. Cl.
CPC .......... *H04L 65/403* (2013.01); *H04L 65/605* (2013.01); *H04L 65/80* (2013.01)

(58) Field of Classification Search
CPC ........ H04N 7/15; H04N 5/265; H04L 65/403; H04L 12/1822; H04L 12/1827
USPC ................................. 381/119, 66
See application file for complete search history.

(56) References Cited

U.S. PATENT DOCUMENTS

| | | | |
|---|---|---|---|
| 6,847,618 B2 | 1/2005 | Laursen et al. | |
| 6,989,856 B2 | 1/2006 | Firestone et al. | |
| 7,526,567 B2 | 4/2009 | Yoneda et al. | |
| 8,482,593 B2 | 7/2013 | Periyannan et al. | |
| 2005/0078170 A1* | 4/2005 | Firestone | H04L 12/1822 348/14.08 |
| 2011/0279635 A1* | 11/2011 | Periyannan | H04N 7/141 348/14.09 |
| 2013/0100352 A1* | 4/2013 | McGowan | H04N 7/152 348/659 |
| 2013/0191485 A1* | 7/2013 | Spencer | H04L 65/608 709/207 |

* cited by examiner

*Primary Examiner* — Tauqir Hussain
*Assistant Examiner* — Kamran Mohammadi
(74) *Attorney, Agent, or Firm* — Edell, Shapiro & Finnan, LLC

(57) ABSTRACT

A scalable media conferencing system minimizes delay while maintaining a consistent session across all of the distributed media servers handling the conference session. Each of the media servers sends a list of the local top streams and their importance. A global list of top streams is created and disseminated to all of the media servers. Each of the media servers then forwards any local stream that is on the list of global top streams to all of the other media servers. Once a media server receives all of the streams on the list of global top streams, it locally mixes the streams together and outputs the mixed stream to the endpoints that are locally connected to that media server.

16 Claims, 6 Drawing Sheets

DISTRIBUTED AUDIO MIXING AND FORWARDING

TECHNICAL FIELD

The present disclosure relates to audio processing in scalable multimedia conferences.

BACKGROUND

In large scale multimedia conferences, multiple conference servers, each serving a limited number of clients, are typically connected to provide a single conference service/session. One of the challenges associated with large scale multimedia conferences is the distribution of audio for the currently active participants in the conference session. Various techniques have been developed to address this issue, but there is room for improvement, particularly in terms of the efficiency with which audio streams are mixed and forwarded by the servers.

DESCRIPTION OF EXAMPLE EMBODIMENTS

Overview

Techniques are presented herein for audio mixing and distribution for a scalable media conferencing system that minimizes delay while maintaining a consistent session across a plurality of distributed media servers handling the conference session. Each of the media servers sends a list of the local top streams and their importance. A global list of top streams is created and disseminated to all of the media servers. Each of the media servers then forwards any local stream that is on the list of global top streams to all of the other media servers. Once a media server receives all of the streams on the list of global top streams, it locally mixes the streams together and outputs the mixed stream to the endpoints that are locally connected to that media server.

Example Embodiments

Figure 1:
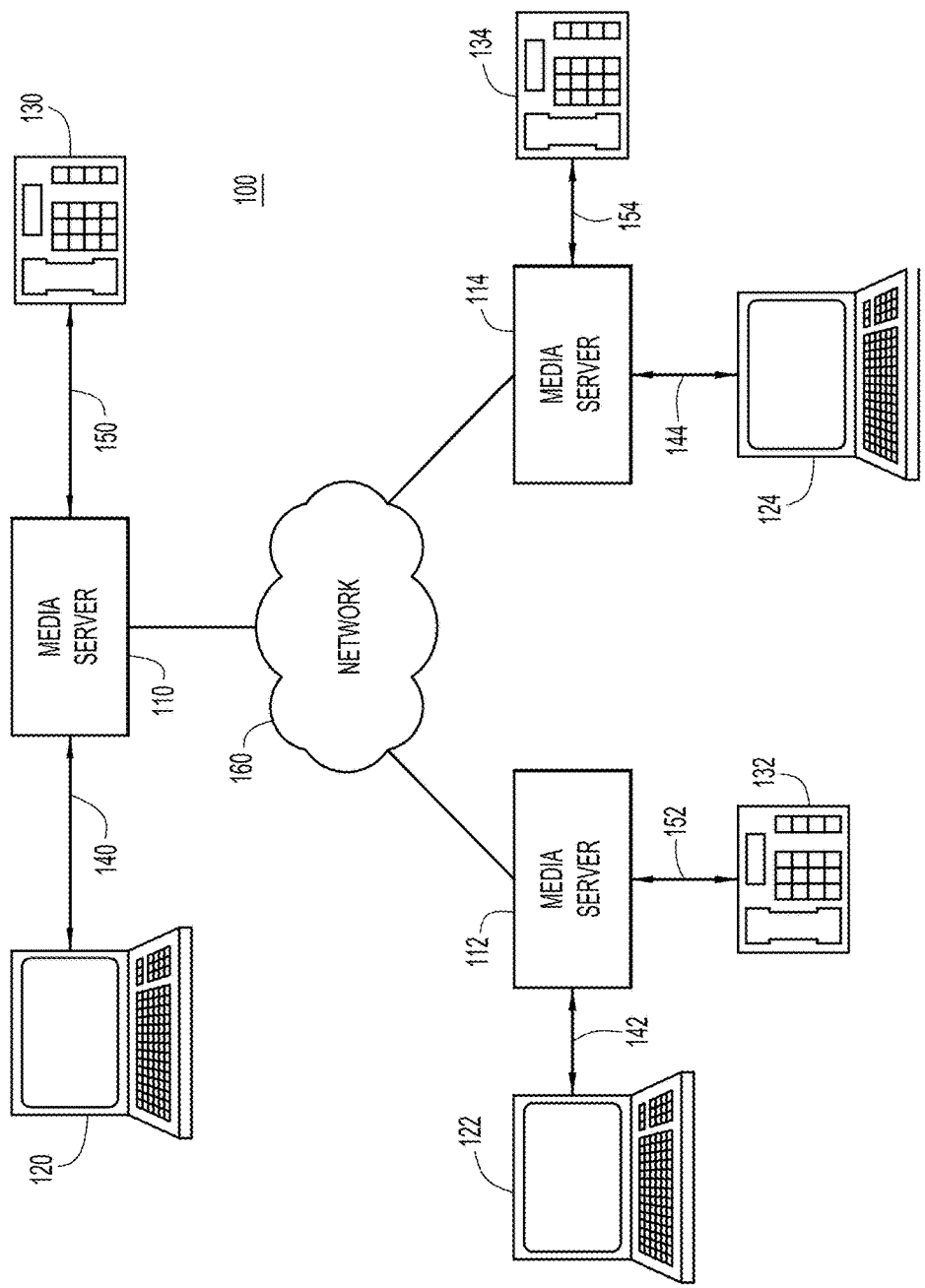
FIG. 1 is a diagram of a distributed media server system in which the techniques presented herein may be used.

Referring to FIG. 1, a distributed media server system 100 is provided to support a conference session. The system comprises a plurality of media servers, e.g., media servers 110, 112, and 114, each of which connects to a plurality of endpoints that participate in the conference session. FIG. 1 shows an oversimplified example in which there are two endpoints connected to media server 110, laptop 120 and telephone 130. Laptop 120 connects to media server 110 by network link 140, and telephone 130 connects to media server 110 by network link 150. Laptop 122 and telephone 132 connect to media server 112 by network links 142 and 152, respectively. Laptop 124 and telephone 134 connect to media server 114 by network links 144 and 154, respectively. Media servers 110, 112, and 114 connect to each other by network 160, which consists of one or more wide area networks and/or local area networks.

While only one laptop 120 and one telephone 130 are shown connected to media server 110, any number of endpoints may be connected to any of the media servers. Additionally, endpoints are not limited to laptops and telephones and may comprise desktop computers, tablet computers, smart phones, Internet phones, or any type of other computing device that is capable of sending and/or receiving some type of multimedia stream. The networks connecting the endpoints to their respective media servers and the networks connecting the media servers to each other may comprise any type of network (e.g., Public System Telephone Network, local area network, wide area network, wireless local area networks, wireless wide area networks, etc.) that is capable of carrying the data of the conference session. In one example, media servers 110, 112, and 114 are at three distinct physical locations with each of the endpoints relatively local to the media server to which it is connected. In other words, each of the endpoints is connected to the media server that is physically closest, in this example.

Figure 2:
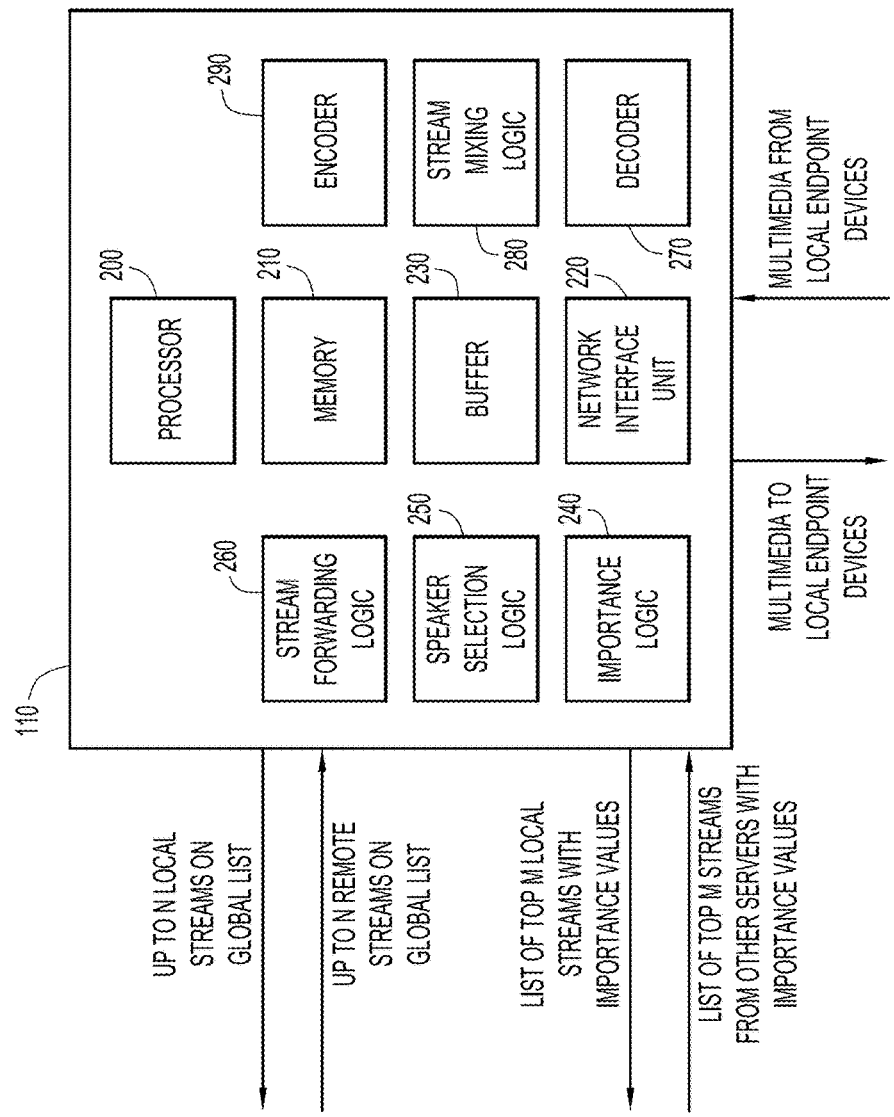
FIG. 2 is a block diagram of one of the servers in the distributed media server system of FIG. 1, the server configured to perform the distributed audio mixing and forwarding techniques presented herein.

Referring now to FIG. 2, a block diagram of media server 110 is described. Media server 110 is used as an example of one of the media servers shown in FIG. 1, and any of the media servers in the system 100 supporting the conference session may comprise similar elements and perform similar functions. Media server 110 includes a processor 200, memory 210, network interface unit 220 configured to enable network communications, a buffer 230, importance logic 240, speaker selection logic 250, stream forwarding logic 260, decoder 270, stream mixing logic 280, and encoder 290.

Processor 200 may comprise one or a plurality of processors and is configured to control operations of media server 110. Processor 200 may execute one or more software programs stored in memory 210. Data representing multimedia streams and/or information about multimedia streams may also be stored in memory 210. Buffer 230 stores multimedia streams as they are being processed by media server 110, and may comprise a portion of memory 210. The functional blocks 240-290 of media server 110 may be embodied by dedicated or combined application specific integrated circuits (ASICs) containing digital logic. Alternatively, one or more of the functional blocks 240-290 may be embodied by software stored in memory 210 and executed by processor 200.

Memory 210 may comprise read only memory (ROM), random access memory (RAM), magnetic disk storage media devices, optical storage media devices, flash memory devices, electrical, optical, or other physical/tangible memory storage devices. The processor 200 is, for example, a microprocessor or microcontroller that executes instructions for any of the logic described in media server 110. Thus, in general, the memory 210 may comprise one or more tangible (non-transitory) computer readable storage media (e.g., a memory device) encoded with software comprising computer executable instructions and when the software is executed (by the processor 200) it is operable to perform the operations described herein.

Two examples of media server architectures/infrastructures will be described with respect to the operation of media server 110. In the Symmetric architecture, all of the media servers perform the same functions. In the Asymmetric architecture, one server is designated as the Primary server, and the remaining servers are Secondary servers. While the Asymmetric architecture designates only one server as the Primary server, any of the servers as described herein are capable of performing the functions of the Primary server. The Asymmetric architecture may be used to ensure the synchronization of all of the servers, at the expense of the overhead used to designate the Primary server.

In one example of operation, for both types of architectures, media server 110 receives multimedia streams (e.g., audio streams and/or video streams) from its local endpoints through network interface unit 220. Media server 110 may process the streams with importance logic 240 to determine which streams are the most important. For example, media server 110 may analyze an audio stream to detect if the audio stream contains speech. Another indication of importance may be the volume level of the audio stream. The volume level may be calculated from the stream energy by either the endpoint or media server 110, or the volume level may be directly associated with a setting in the endpoint or media server 110, such as the gain of the microphone. Alternatively, the endpoint may provide the media server with an indication of the importance of a particular stream that is unrelated to the actual content of the stream. For example, in an online classroom session, the stream of the teacher may be permanently marked as important so that the teacher's stream is always presented to all of the other endpoints.

Using the indications of importance, speaker selection logic 250 ranks the local streams in order of importance and selects the top M local streams to create a list of local top streams. The list of local top streams includes the indications of importance, such as the stream energy, so that each stream's energy can be compared with the energy of other streams, remote from media server 110. In the Symmetric infrastructure example, media server 110 then sends the list of local top streams to the other media servers 112 and 114 using network interface unit 220 to communicate to the other media servers 112 and 114. In the Asymmetric infrastructure example, media server 110 only sends the list of local top streams to the Primary server, if media server 110 is a Secondary server. If media server 110 is designated as the Primary server, then the list of local top streams is not sent to any of the other servers.

In the Symmetric infrastructure, media server 110 receives lists from the other media servers 112 and 114 along with the indications of importance. These lists allow speaker selection logic 250 to compare the streams from all of the media servers and determine the top N streams selected from all of the streams. Speaker selection logic 250 creates a list of global top streams that identifies the streams from any media server that have the highest importance at this time and will be included in the conference session. Media servers 112 and 114 perform similar determinations, such that all three media servers 110, 112, and 114 each obtain the list of global top streams independently. Since all three media servers 110, 112, and 114 receive the same input of local top streams from the other servers, the list of global top streams in each media server is the same.

In the Asymmetric infrastructure, the Primary server functions as described above in the Symmetric infrastructure, but it also transmits the list of global top streams back to all of the Secondary servers. The Secondary servers do not receive the information necessary to determine the list of global top streams, and must wait for the Primary server to provide the list of global top streams. Once the Secondary servers receive the list of global top streams from the Primary server, all of the servers have obtained the same list of global top streams.

Additionally, the Symmetric and Asymmetric infrastructures are not mutually exclusive and some features of the Symmetric and Asymmetric infrastructures may be combined in a single system. For example, one server may be designated as the Primary server and send the list of global top streams to all of the Secondary servers, but all of the servers continue to send lists of local streams to all of the servers, as described above with respect to the Symmetric infrastructure.

Referring still to FIG. 2, once media server 110 has obtained a list of global top streams, either by receiving the list from the Primary server, or by calculating it from information received from all the other servers, stream forwarding logic 260 compares the list of global top streams to the local streams received from local endpoints. Any local streams that are on the list of global top streams are forwarded to all of the other media servers 112 and 114, and any local streams that are not on the global top streams are not forwarded. In this way, up to N local streams, corresponding to the list of N global top streams are forwarded to all of the other media servers 112 and 114.

Since the other media servers 112 and 114 are processing their respective local streams against the same list of global top streams, any streams that are remote to media server 110 will be forwarded by media server 112 and/or media server 114 that is local to any stream that is on the list of global top streams. In this way, up to N remote streams, corresponding to the list of N global top streams are received by media server 110 from media server 112 and/or from media server 114.

Once media server 110 has received all of the streams that are on the list of global top streams, decoder 270 decodes all of the streams in preparation for stream mixing logic 280 to combine the streams into a single output stream. The combined stream is then encoded by encoder 290 and sent to local endpoints 120 and 130 over networks 140 and 150. Alternatively, the separate streams may be forwarded directly to a local endpoint without mixing the streams. For example, if laptop 120 has the capability to process and output multiple streams, then the individual streams on the global top streams list may be forwarded from media server 110 to laptop 120. In one example, laptop 120 receives the separate streams from the global top streams list, while telephone 130 receives a combined stream formed by stream mixing logic 280.

Figure 3A:
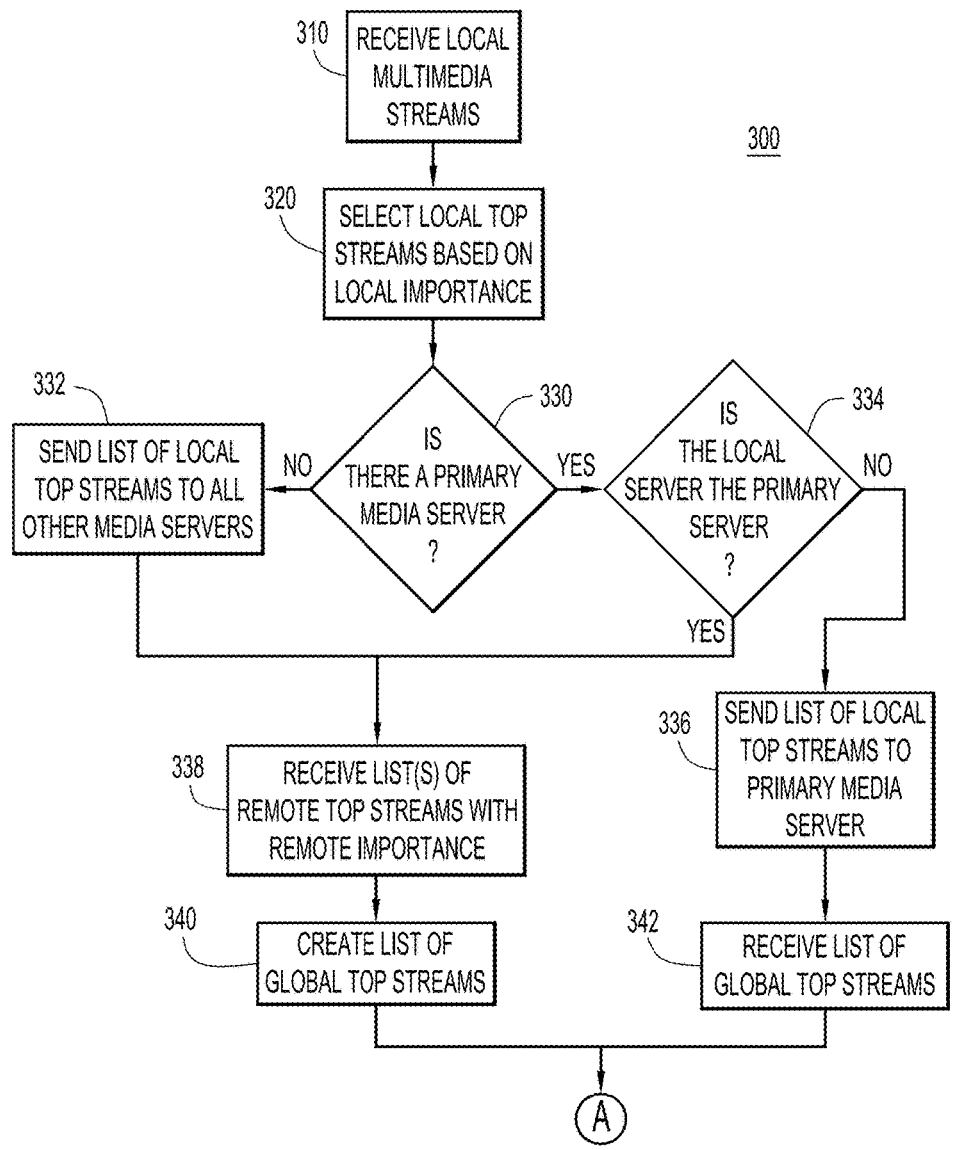
FIGS. 3A and 3B are flowcharts illustrating an example process of transmitting multimedia in the distributed media server system according to the techniques presented herein.
Figure 3B:
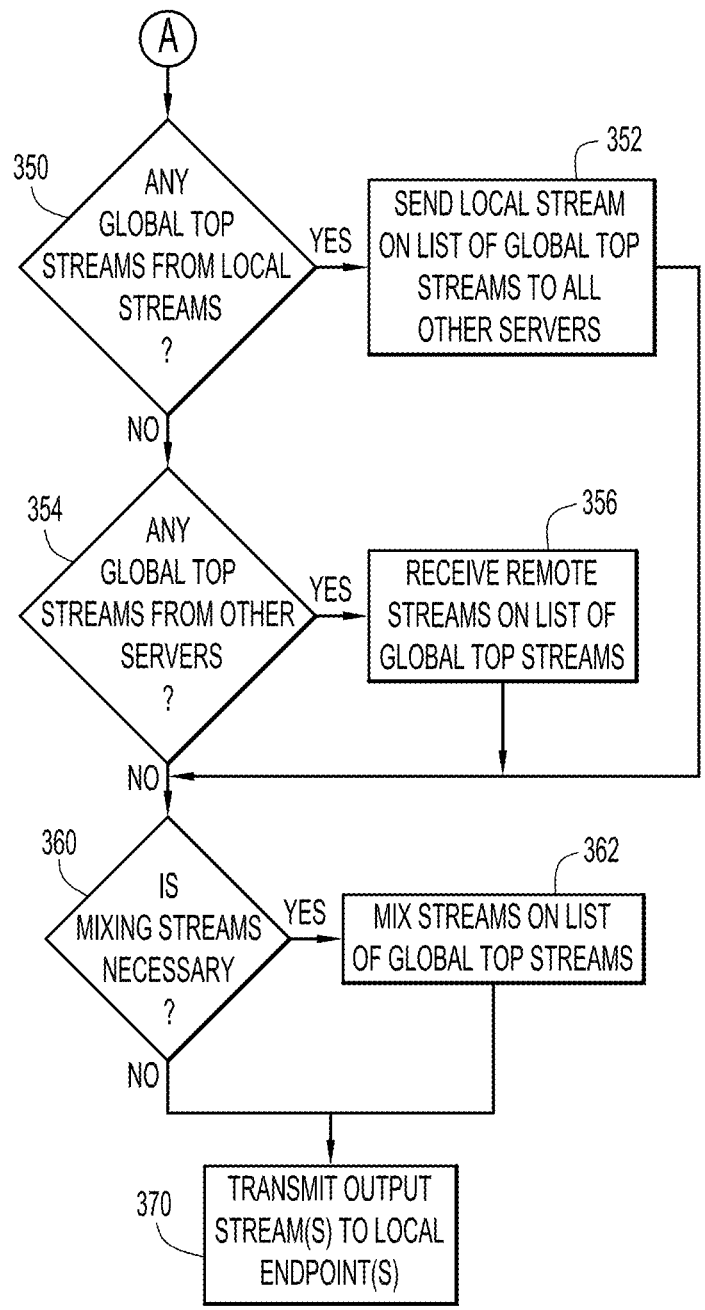

Referring now to FIGS. 3A and 3B, a flowchart is shown of an example process 300 for transmitting multimedia streams in a conference session and maintaining consistency across all of the endpoints while minimizing delay in the streams. FIGS. 3A and 3B are described with respect to media server 110 but it should be understood that media servers 112 and 114 are also performing this process.

In step 310, media server 110 receives local multimedia streams from its endpoints. From the local streams, media server 110 selects the local top streams based on a measure of importance (e.g., stream energy) at step 320.

Depending on the specific infrastructure type, media server 110 may forward a list of the local top streams to one or more other media servers. If there is not a Primary server designated, as determined in step 330, then a Symmetric infrastructure is assumed for this example. In this Symmetric infrastructure case, media server 110 sends, at step 332, the list of local top streams along with their respective indications of importance to the other media servers 112 and

114. If there is a Primary server designated, as determined in step 330, then an Asymmetric infrastructure is assumed for this example. In the Asymmetric infrastructure case, when media server 110 is the Primary server, as determined in step 334, then it does not need to send the list of local top streams to any server, since it will be creating the list of global top streams itself. If media server 110 is not the Primary server, then it sends the list of local top streams to the designated Primary server in step 336.

In the Symmetric infrastructure case, or if media server 110 is designated as the Primary server, then media server 110 receives a list of remote top streams along with indications of importance from each of the other servers in the conference at step 338. In step 340, media server 110 combines the lists of remote top streams with the list of local top streams and uses the respective indications of importance to create a list of global top streams. The list of global top streams comprises a list of the streams that are going to be shared between all of the endpoints participating in the conference session.

In one example, if media server 110 is a Secondary server, then it waits for the Primary server to create the list of global top streams, since it does not receive the lists of remote top streams. After the Primary server has created the list of global top streams, it sends the list to media server 110, and media server 110 receives the list of global top streams in step 342.

After steps 340 and 342, in either the Symmetric or Asymmetric infrastructure, media server 110 has created the list of local top streams, obtained a list of global top streams, and received the local multimedia streams from the local endpoints. In step 350, media server 110 determines if any of the local streams are on the list of global top streams. In step 352, media server 110 forwards to media server 112 and media server 114, any local stream that is determined, at step 350, to be on the list of global top streams. If any of the streams on the list of global top streams is a remote stream coming from media server 112 and/or media server 114, as determined in step 354, then media server 110 receives the remote stream(s) at step 356.

After step 356, media server 110 has the multimedia streams corresponding to the list of global top streams and prepares to send the output stream to local endpoints 120 and 130. If any of the local endpoints 120 and/or 130 requires a single mixed stream, as determined at step 360, then media server 110 mixes the streams that are on the list of global top streams into a combined output stream in step 362. At step 370, media server 110 transmits the output stream to local endpoints 120 and 130. Media server 110 may also transmit the individual streams that are on the list of global top streams if a local endpoint is able to handle multiple streams.

In a summary of process 300, media server 110 supports a conference session by communicating with a plurality of servers (e.g., media server 112 and media server 114), as well as with a plurality of endpoints (e.g., laptop 120 and telephone 130). Media server 110 receives a plurality of local multimedia streams from the plurality of endpoints, and each local multimedia stream has a corresponding indication of local importance. Media server 110 selects a plurality of local top multimedia streams from the plurality of local multimedia streams based on their corresponding indications of local importance, and creates a list of the local top multimedia streams with the corresponding indications of local importance.

After the list of local top multimedia streams has been passed to the appropriate server, media server 110 obtains a list of global top multimedia streams selected from the list of local top multimedia streams as well as at least one of the lists of remote top multimedia streams. The list of global top multimedia streams is based on the indications of local importance corresponding to the local top multimedia streams and the remote top multimedia streams. Media server 110 determines which of the global top multimedia streams are selected from the local multimedia streams and which of the global top multimedia streams are selected from the remote top multimedia streams. All of the global top multimedia streams that are selected from the remote top multimedia streams are received from one or more of the other servers (e.g., media server 112 and/or media server 114). After receiving the remote top multimedia streams, media server 110 transmits an output multimedia stream comprising a combination of the local top multimedia streams and the remote top multimedia streams to at least one endpoint among the plurality of endpoints connected to media server 110.

Figure 4:
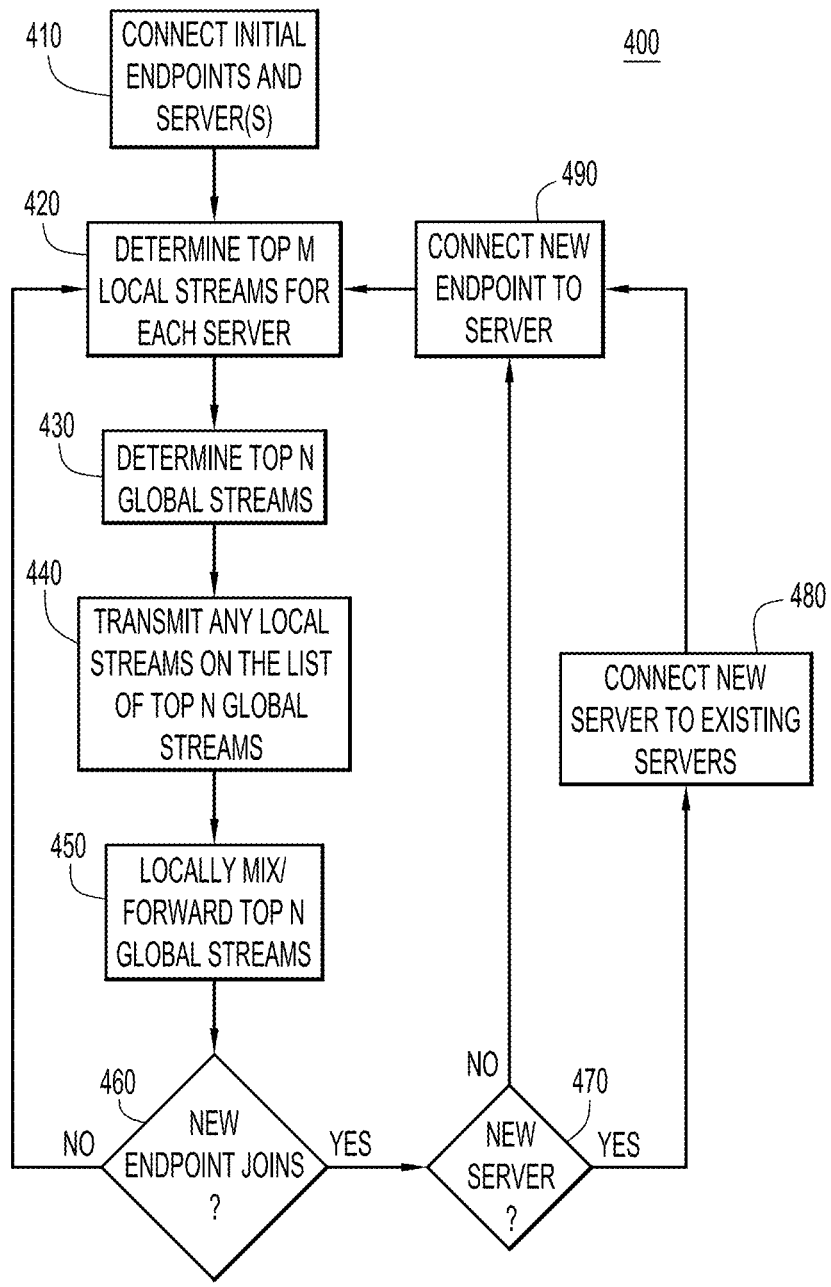
FIG. 4 is a flowchart illustrating an example process of connecting servers to support a large scale conference session using the techniques presented herein.

Referring now to FIG. 4, an example process 400 of connecting servers together to build and support the conference session while maintaining consistency across all of the media servers and endpoints is described. Initially, at least one endpoint is connected to a media server in step 410. The initial configuration may include multiple endpoints connected to one or more servers, as long as all of the endpoints are able to communicate multimedia streams back and forth between one of the servers and the servers are able to communicate with each other. Every predetermined time T1 (e.g., 100 ms), the process loops through each of the remaining steps in process 400, which determines and propagates the global top streams to all of the media servers and adds any newly joined endpoints and/or servers.

In step 420, each server determines the top M local streams from the streams of the endpoints connected to that server. Each of the streams from the local endpoints is associated with an indication of importance that is able to be compared globally against indications of importance from other servers. In one example, the indication of importance is a value related to the loudness of the audio (e.g., stream energy) in the stream. This value may be measured or calculated by the media server that receives the stream from the local endpoint, or it may be derived by the endpoint and sent to the media server along with the stream. In another example, the indication of importance is related to the user of the endpoint, such that some users' (e.g., a group leader, professor, CEO, etc.) endpoints are indicated as having a higher or lower importance to the conference session than other users' (e.g., auditors, administrative staff, etc.) endpoints.

After a list of the top M local streams is created in each media server, a list of the top N global streams is determined in step 430 based on the relative indications of importance of the streams. The list of global top streams may be determined by each media server sending their list of respective local top streams, along with their associated indications of importance, to all of the other media servers, and having each media server determine the list of global top streams. In another example, each of the media servers send their list of respective local top streams to a Primary server which determines the list of global top streams and sends the list of global top streams back to all of the other media servers.

The amount of data in the lists of top streams is relatively small, since the lists do not contain the data in the actual stream. Consequently, the exchange of lists and determination of the global top streams does not require as much bandwidth as exchanging entire streams, and proceeds relatively quickly.

Once a media server has obtained the list of global top streams, for example, by receiving it from the Primary server or by determining it from information received from other media servers, then the media server compares the list of global top streams to the local streams on that media server. Any local streams that are on the list of global top streams are sent to all of the other media servers in the conference session in step 440. Only the streams that are on the list of global top streams are transmitted to the other media servers. The streams that are not on the list of global top streams are not sent across the network connecting the media servers. After all of the media servers have sent their respective local streams that are on the list of global top streams, each media server has all of the global top streams.

After a media server has received all of the global top streams, it may mix the global top streams into single output stream in step 450. The output stream is forwarded to each of the local endpoints connected to the media server where it is output to the user(s) of the endpoint. If a particular endpoint is able to process multiple streams, the media server may forward all of the global top streams as separate streams to that particular endpoint. In one example, the media server may mix the global top streams into a single output stream for some endpoints, while simultaneously forwarding the separate streams to other endpoints. If all of the endpoints connected to media server are able to process multiple streams, such that the media server will only be forwarding the global top streams, then the media server may forgo mixing the global top streams into a single output stream.

If no new endpoint joins the conference session, as determined in step 460, then the process loops back to step 420 at the next predetermined time T1. When a new endpoint joins the conference session new connections will be set up to allow the new endpoint to contribute to the conference session. If the new endpoint requires a new server, as determined in step 470, then the new server is connected in step 480 to at least one existing server that is participating in the conference session. In one example, a new server may be added when the physical separation between the new endpoint and the existing servers is large. The new endpoint is connected to a media server in step 490, and the process loops back to step 420 at the next predetermined time T1.

By virtue of process 400 looping back to determine a new set of local top streams and global top streams every predetermined time T1, new streams are able to join and may be included in the list of global top streams every predetermined time T1. This allows the conference session to focus on only the speakers who are active in that particular time segment, while the active speakers may change in each new time segment.

Figure 5:
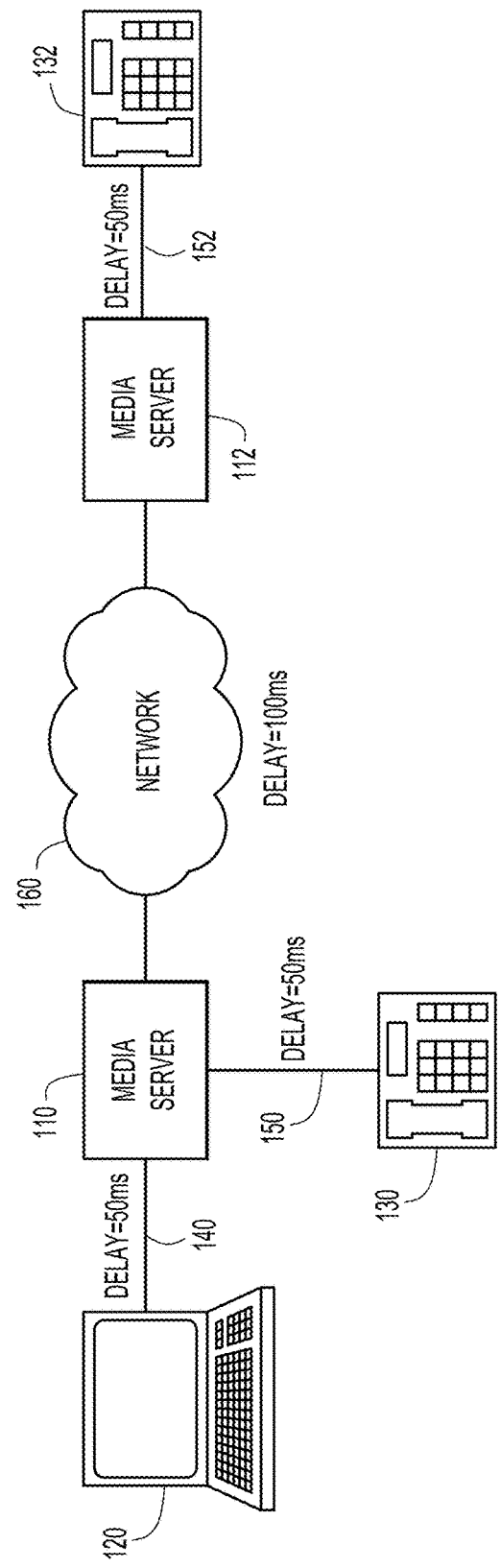
FIG. 5 is a diagram illustrating how delay between servers is reduced according to the techniques presented herein.

Referring now to FIG. 5, an example is shown that illustrates the reduction in delay achieved by the techniques presented herein in comparison to a system with a global mixer. The example of FIG. 5 will be described with respect to audio streams, but the same principles apply generally to any multimedia stream. In this example, media server 110 is connected to media server 112 via the network 160, which introduces a 100 millisecond delay to the audio streams as they traverse the network 160. Endpoints 120 and 130 are connected to media server 110 over networks 140 and 150, respectively. The connections over networks 140 and 150 each introduce a 50 millisecond delay. Endpoint 132 is connected to media server 112 over network 152, which also introduces a 50 millisecond delay. In this example, the delay is the same in both directions for simplicity, but the delay may differ based on the direction of the network traffic. In other words, for this example, network traffic from media server 110 to media server 112 experiences the same 100 millisecond delay that traffic from media server 112 to media server 110 experiences. In addition to the delay caused by the various network links that an audio stream passes through, there is also a delay (e.g., 50 milliseconds) to account for jitter in the networks. The numerical values for the delay listed above are merely examples, and may vary from these values in other examples.

In a system with a single global mixer in media server 112, all of the audio from endpoints 120, 130, and 132 must pass through the global mixer in media server 120. After being mixed, the output audio is passed to all of the media servers, and each media server then forwards the mixed output audio to their local endpoints. Tracing a path from endpoint 130 to media server 110 (50 millisecond (ms) delay associated with network 150), from media server 110 to the global mixer in media server 112 (100 ms delay associated with network 160), back from media server 112 to media server 110 (100 ms delay associated with network 160), and from media server 110 to endpoint 120 (50 ms delay associated with network 140), the total delay from the various network connections adds up to 300 milliseconds. Adding another 50 milliseconds delay to account for jitter in the networks, the total delay in endpoint 120 producing the audio originating from endpoint 130 is 350 milliseconds. Similarly, the delay in endpoint 120 producing the audio originating from endpoint 132 is 250 milliseconds.

In contrast, when both media servers 110 and 112 have the ability to mix audio streams in a consistent manner, as enabled by the techniques presented above, the streams do not need to pass through a global mixer. In this case, the audio from endpoint 130 goes from endpoint 130 to media server 110 (50 ms delay from network 150), where it is mixed with the audio from endpoints 120 and 132. The output stream including the audio from endpoint 130 then goes from media server 110 to endpoint 120 (50 ms delay from network 140). Adding in a 50 millisecond delay to account for jitter, and the total delay in endpoint 120 producing the audio originating from endpoint 130 is 150 milliseconds, which is 200 milliseconds less than the case with a global mixer described previously.

Delay from the network connections manifests itself in an audio stream by a time gap between people's speech. For example, in a conference session including two people, after the first person asks the second person a question, there is a gap before the first person can hear the second person's answer due to the delay in sending the audio streams back and forth. As the delay inherent in the network(s) gets larger, the gap becomes more distracting and makes the conference session more disjointed. Reducing the effect of the delay allows for a better user experience in the conference session, such that the user experience in the conference session approaches that of face-to-face conversations.

By mixing the audio locally, and removing the round trip across network 160, the delay in some audio streams is substantially reduced. Additionally, the Symmetric infrastructure can similarly reduce the delay in selecting a new speaker, since it avoids the delay in sending the list of global top streams from the Primary server to the Secondary servers. This may be important to avoid cutting off the first word or syllable of a sentence when a new speaker starts speaking.

The techniques described herein have been presented in the general context of multimedia streams, and more specifically in the context of audio streams. Multimedia streams may also comprise video, audio, data associated with content (e.g., desktop, application, file, etc.) sharing, shared whiteboards, chat sessions, annotations, multimedia notes and/or question/answer data, polling data, media used in a rich media conference, or any combination thereof. If a multimedia stream comprises multiple types of information, in some cases only one of the components may be mixed, while the other components are shared as separate streams. For example, in a conference session with audio and video components, the audio streams may be mixed into a single output audio stream, while the video streams are maintained as separate entities to be displayed individually at the endpoints. However, even when the video is maintained as separate streams, the selection of the global top N audio streams may affect which video streams are propagated throughout the conference session. In this way, only the video of the conference participants who are currently speaking may be sent over the network between media servers.

In summary, the techniques presented herein provide for an architecture and approach for distributed mixing/forwarding of multimedia streams. The architecture fits well into a scenario in which the media servers are geographically distributed around the world with a long delay between servers. Scalability is achieved through the multiple server connections with a fixed and limited number of streams being exchanged.

In one form, a method is provided comprising: at a first server among a plurality of servers in communication with each other and each of which processes multimedia signals associated with a conference session, receiving a plurality of local multimedia streams, each local multimedia stream having a corresponding indication of local importance; selecting a plurality of local top multimedia streams among the plurality of local multimedia streams based on the corresponding indications of local importance; creating a list of the local top multimedia streams with the corresponding indications of local importance; obtaining a list of global top multimedia streams, selected from the list of local top multimedia streams and at least one list of remote top multimedia streams, based on the indications of local importance corresponding to the local top multimedia streams and at least one indication of remote importance corresponding to at least one remote top multimedia stream; determining which of the global top multimedia streams are selected from the local multimedia streams and which of the global top multimedia streams are selected from the remote top multimedia streams to be included in the list of global top multimedia streams; receiving, from one or more other servers different from the first server, any remote top multimedia streams that are determined to be in the list of global top multimedia streams; and generating an output multimedia stream based on a combination of the local multimedia streams that are determined to be on the list of global top multimedia streams and the received remote top multimedia streams that are determined to be on the list of global top multimedia streams.

Likewise, an apparatus is provided comprising a network interface unit configured to enable communication over a network in order to transmit and receive a plurality of local multimedia streams, each local multimedia stream having a corresponding indication of local importance, and to communicate with a plurality of servers; and a processor coupled to the network interface unit. The processor is configured to: select a plurality of local top multimedia streams among the plurality of local multimedia streams based on the corresponding indications of local importance; create a list of the local top multimedia streams with the corresponding indications of local importance; obtain a list of global top multimedia streams, selected from the list of local top multimedia streams and at least one list of remote top multimedia streams received through the network interface unit, based on the indications of local importance corresponding to the local top multimedia streams and at least one indication of remote importance corresponding to at least one remote top multimedia stream; determine which of the global top multimedia streams are selected from the local multimedia streams and which of the global top multimedia streams are selected from the remote top multimedia streams to be included in the list of global top multimedia streams; receive, from one or more other servers of the plurality of servers, any remote top multimedia streams that are determined to be in the list of global top multimedia streams; and generate an output multimedia stream based on a combination of the local multimedia streams that are determined to be on the list of global top multimedia streams and the received remote top multimedia streams that are determined to be on the list of global top multimedia streams.

Similarly, one or more computer readable storage media are provided encoded with software comprising computer executable instructions and when the software is executed operable to cause a processor to: select a plurality of local top multimedia streams among a plurality of local multimedia streams received at a first server among a plurality of servers, wherein each local multimedia stream has a corresponding indication of local importance, and wherein the selection of the plurality of local top multimedia streams is based on the corresponding indications of local importance; create a list of the local top multimedia streams with the corresponding indications of local importance; obtain a list of global top multimedia streams, selected from the list of local top multimedia streams and at least one list of remote top multimedia streams received through a network interface unit, based on the indications of local importance corresponding to the local top multimedia streams and at least one indication of remote importance corresponding to at least one remote top multimedia stream; determine which of the global top multimedia streams are selected from the local multimedia streams and which of the global top multimedia streams are selected from the remote top multimedia streams to be included in the list of global top multimedia streams; receive, from one or more other servers, any remote top multimedia streams that are determined to be in the list of global top multimedia streams; and generate an output multimedia stream based on a combination of the local multimedia streams that are determined to be on the list of global top multimedia streams and the received remote top multimedia streams that are determined to be on the list of global top multimedia streams.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
at a first server among a plurality of servers in communication with each other and each of which processes multimedia signals associated with a conference session, receiving a plurality of local multimedia streams, each local multimedia stream having a corresponding indication of local importance, wherein each local multimedia stream in the plurality of local multimedia streams comprises a local video stream and a local audio stream;
selecting a plurality of local top multimedia streams among the plurality of local multimedia streams based on the corresponding indications of local importance;
creating a list of the local top multimedia streams with the corresponding indications of local importance;
receiving lists of remote top multimedia streams from one or more other servers among the plurality of servers, each list of remote top multimedia streams being based on indications of local importance corresponding to one of the other servers;
determining whether the first server is a primary server responsible for generating a list of global top multimedia streams;
responsive to a determination that the first server is the primary server, generating the list of global top multimedia streams by selecting from the list of local top multimedia streams and at least one of the lists of remote top multimedia streams based on the indications of local importance;
forwarding the list of global top multimedia streams to the one or more other servers;
determining which of the global top multimedia streams are selected from the local multimedia streams and which of the global top multimedia streams are selected from the remote top multimedia streams to be included in the list of global top multimedia streams;
receiving at the first server, from one or more other servers different from the first server, any remote top multimedia streams that are determined to be in the list of global top multimedia streams, wherein each of the remote top multimedia streams comprises a remote video stream and a remote audio stream;
at the first server, mixing the local audio streams corresponding to the local multimedia streams that are determined to be on the list of global top multimedia streams with the remote audio streams corresponding to the received remote top multimedia streams that are determined to be on the list of global top multimedia streams to create a mixed multimedia stream comprising a mixed audio stream and a plurality of global video streams; and
transmitting the mixed multimedia stream to at least one endpoint device associated with the first server.

2. The method of claim 1, further comprising transmitting, from the first server to one or more of the other servers, the list of local top multimedia streams with the corresponding indications of local importance.

3. The method of claim 1, further comprising forwarding, from the first server to the other servers, the local multimedia streams that are determined to be on the list of global top multimedia streams, and not forwarding, from the first server to the other servers, the local multimedia streams that are determined not to be on the list of top global multimedia streams.

4. The method of claim 1, further comprising the first server mixing the local multimedia streams that are determined to be on the list of global top multimedia streams with the received remote top multimedia streams that are determined to be on the list of global top multimedia streams, to create a fully mixed multimedia stream, and transmitting the fully mixed multimedia stream to the at least one endpoint device associated with the first server.

5. The method of claim 1, further comprising forwarding, from the first server to the one or more other servers, the local multimedia streams that are determined to be on the list of global top multimedia streams and the received remote top multimedia streams that are determined to be on the list of global top multimedia streams without mixing.

6. The method of claim 1, wherein each of the indications of local importance comprises a loudness of the local audio stream associated with the corresponding local multimedia stream, and wherein each of the indications of remote importance comprises a loudness of the remote audio stream associated with the corresponding remote multimedia stream.

7. An apparatus comprising:
a network interface unit configured to enable communication over a network in order to transmit and receive a plurality of local multimedia streams, each local multimedia stream having a corresponding indication of local importance, and to communicate with a plurality of servers, wherein each local multimedia stream in the plurality of local multimedia streams comprises a local video stream and a local audio stream; and
a processor coupled to the network interface unit, and configured to:
select a plurality of local top multimedia streams among the plurality of local multimedia streams based on the corresponding indications of local importance;
create a list of the local top multimedia streams with the corresponding indications of local importance;
receive via the network interface unit, lists of remote top multimedia streams from one or more other servers among the plurality of servers, wherein each list of remote top multimedia streams is based on indications of local importance corresponding to one of the other servers;
generate a list of global top multimedia streams, selected from the list of local top multimedia streams and at least one list of remote top multimedia streams received through the network interface unit, based on the indications of local importance corresponding to the local top multimedia streams and at least one indication of remote importance corresponding to at least one remote top multimedia stream;
cause the network interface unit to forward the list of global top multimedia streams to the one or more other servers;
determine which of the global top multimedia streams are selected from the local multimedia streams and which of the global top multimedia streams are selected from the remote top multimedia streams to be included in the list of global top multimedia streams;
receive, from one or more other servers of the plurality of servers, any remote top multimedia streams that are determined to be in the list of global top multimedia streams, wherein each of the remote top multimedia streams comprises a remote video stream and a remote audio stream;
mix the local audio streams corresponding to the local multimedia streams that are determined to be on the list of global top multimedia streams with the remote audio streams corresponding to the received remote top multimedia streams that are determined to be on the list of global top multimedia streams to create a mixed multimedia stream comprising a mixed audio stream and a plurality of global video streams, and cause the network interface unit to transmit the mixed multimedia stream to the at least one endpoint device.

8. The apparatus of claim 7, wherein the processor is further configured to transmit to one or more of the other servers, the list of local top multimedia streams with the corresponding indications of local importance.

9. The apparatus of claim 7, wherein the processor is further configured to mix the local multimedia streams that are determined to be on the list of global top multimedia streams with the received remote top multimedia streams that are determined to be on the list of global top multimedia streams to create a fully mixed multimedia stream, and to transmit the fully mixed multimedia stream to the at least one endpoint device associated with the apparatus.

10. One or more non-transitory computer readable storage media encoded with software comprising computer executable instructions and when the software is executed operable to cause a processor to:
  select a plurality of local top multimedia streams among a plurality of local multimedia streams received at a first server among a plurality of servers, wherein each local multimedia stream has a corresponding indication of local importance, and wherein the selection of the plurality of local top multimedia streams is based on the corresponding indications of local importance, and wherein each local multimedia stream comprises a local video stream and a local audio stream;
  create a list of the local top multimedia streams with the corresponding indications of local importance;
  receive lists of remote top multimedia streams from one or more other servers among the plurality of servers, wherein each list of remote top multimedia streams is based on indications of local importance corresponding to one of the other servers;
  generate a list of global top multimedia streams, selected from the list of local top multimedia streams and at least one list of remote top multimedia streams received through a network interface unit, based on the indications of local importance corresponding to the local top multimedia streams and at least one indication of remote importance corresponding to at least one remote top multimedia stream;
  forward the list of global top multimedia streams to the one or more other servers;
  determine which of the global top multimedia streams are selected from the local multimedia streams and which of the global top multimedia streams are selected from the remote top multimedia streams to be included in the list of global top multimedia streams;
  receive, from one or more other servers, any remote top multimedia streams that are determined to be in the list of global top multimedia streams, wherein each of the received remote top multimedia streams comprises a remote video stream and a remote audio stream;
  mix the local audio streams corresponding to the local multimedia streams that are determined to be on the list of global top multimedia streams with the remote audio streams corresponding to the received remote top multimedia streams that are determined to be on the list of global top multimedia streams to create a mixed multimedia stream comprising a mixed audio stream and a plurality of global video streams, and
  cause the network interface unit to transmit the mixed multimedia stream to the at least one endpoint device.

11. The one or more non-transitory computer readable storage media of claim 10, wherein the computer executable instructions cause the processor to transmit from the first server to one or more of the other servers, the list of local top multimedia streams with the corresponding indications of local importance.

12. The one or more non-transitory computer readable storage media of claim 10, wherein the computer executable instructions cause the processor to mix the local multimedia streams that are determined to be on the list of global top multimedia streams with the received remote top multimedia streams that are determined to be on the list of global top multimedia streams to create a fully mixed multimedia stream, and transmit the fully mixed multimedia stream to the at least one endpoint device associated with the first server.

13. The apparatus of claim 7, wherein the processor is further configured to cause the network interface unit to forward to the one or more other servers, the local multimedia streams that are determined to be on the list of global top multimedia streams and the received remote top multimedia streams that are determined to be on the list of global top multimedia streams without mixing.

14. The apparatus of claim 7, wherein each of the indications of local importance comprises a loudness of the local audio stream associated with the corresponding local multimedia stream, and wherein each of the indications of remote importance comprises a loudness of the remote audio stream associated with the corresponding remote multimedia stream.

15. The one or more non-transitory computer readable storage media of claim 10, wherein the computer executable instructions cause the processor to forward to the one or more other servers, the local multimedia streams that are determined to be on the list of global top multimedia streams and the received remote top multimedia streams that are determined to be on the list of global top multimedia streams without mixing.

16. The one or more non-transitory computer readable storage media of claim 10, wherein each of the indications of local importance comprises a loudness of the local audio stream associated with the corresponding local multimedia stream, and wherein each of the indications of remote importance comprises a loudness of the remote audio stream associated with the corresponding remote multimedia stream.

* * * * *